US010643540B2

(12) United States Patent
Reavill et al.

(10) Patent No.: US 10,643,540 B2
(45) Date of Patent: *May 5, 2020

(54) CONTROL HEAD WITH ELECTROLUMINESCENT PANEL IN LAND MOBILE RADIO

(71) Applicant: E.F. Johnson Company, Irving, TX (US)

(72) Inventors: Dulie Reavill, Crowley, TX (US); William Earl Dunnigan, Garland, TX (US); Troy Frandsen, Denton, TX (US)

(73) Assignee: E.F. JOHNSON COMPANY, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,563

(22) Filed: Nov. 20, 2017

(65) Prior Publication Data
US 2018/0075807 A1 Mar. 15, 2018

Related U.S. Application Data

(60) Continuation of application No. 14/989,664, filed on Jan. 6, 2016, now Pat. No. 9,824,635, which is a
(Continued)

(51) Int. Cl.
G09G 3/3258 (2016.01)
H01H 13/83 (2006.01)
(Continued)

(52) U.S. Cl.
CPC ......... G09G 3/3258 (2013.01); F21V 23/003 (2013.01); F21V 23/04 (2013.01);
(Continued)

(58) Field of Classification Search
CPC combination set(s) only.
See application file for complete search history.

(56) References Cited

U.S. PATENT DOCUMENTS 4,637,022 A   1/1987 Burke et al.
5,146,217 A * 9/1992 Holmes ................. G08B 5/229
                                                235/382.5

(Continued)

OTHER PUBLICATIONS

Motorola Astro XTL 5000 Digital Mobile Radio, O5 Control Head, User's Guide, May 2005 (120 pages).
(Continued)

Primary Examiner — Nabil H Syed
Assistant Examiner — Cal J Eustaquio
(74) Attorney, Agent, or Firm — Foley & Lardner LLP

(57) ABSTRACT

An exemplary land mobile radio control head and method are provided. In one embodiment, the control head has the capability to utilize halo light of the control head to implement a multi-function indicator that communicates a state of the land mobile radio. In another embodiment, the control head has the capability to provide buffer images constructed from data received from the land mobile radio into a video stream for rendering on an electroluminescent display. In another embodiment, the control head provides the capability for a user to modify a configuration stored on the land mobile radio that defines one of several display modes to be utilized in generating data for use in forming images to be rendered on an electroluminescent display.

19 Claims, 15 Drawing Sheets

Related U.S. Application Data division of application No. 12/614,348, filed on Nov. 6, 2009, now Pat. No. 9,262,958.

(60) Provisional application No. 61/112,086, filed on Nov. 6, 2008.

(51) Int. Cl.

| | | |
|---|---|---|
| *G09G 3/30* | (2006.01) | |
| *G06F 3/0482* | (2013.01) | |
| *G06F 3/0484* | (2013.01) | |
| *G06T 1/60* | (2006.01) | |
| *F21V 23/00* | (2015.01) | |
| *F21V 23/04* | (2006.01) | |
| *H04B 1/401* | (2015.01) | |
| *H05B 33/08* | (2020.01) | |
| *H05B 33/12* | (2006.01) | |
| *F21Y 105/00* | (2016.01) | |
| *F21Y 115/20* | (2016.01) | |
| *F21Y 115/10* | (2016.01) | |

(52) U.S. Cl.
CPC ........ *G06F 3/0482* (2013.01); *G06F 3/04842* (2013.01); *G06T 1/60* (2013.01); *G09G 3/30* (2013.01); *H01H 13/83* (2013.01); *H04B 1/401* (2013.01); *H05B 33/0845* (2013.01); *H05B 33/12* (2013.01); *F21Y 2105/00* (2013.01); *F21Y 2115/10* (2016.08); *F21Y 2115/20* (2016.08); *G09G 2310/08* (2013.01)

(56) References Cited

U.S. PATENT DOCUMENTS

| | | | | |
|---|---|---|---|---|
| 5,291,190 | A * | 3/1994 | Scarola | G21D 3/08 340/3.32 |
| 5,548,832 | A | 8/1996 | Karam | |
| 5,736,973 | A * | 4/1998 | Godfrey | G02F 1/133602 345/102 |
| 5,790,096 | A * | 8/1998 | Hill, Jr. | G09G 5/005 345/600 |
| 5,812,101 | A | 9/1998 | Monarchie et al. | |
| D407,394 | S | 3/1999 | Oh | |
| 6,005,700 | A * | 12/1999 | Pressler | G02B 6/0008 235/492 |
| 6,046,684 | A | 4/2000 | Hamersley et al. | |
| D436,089 | S | 1/2001 | Nishiwaki et al. | |
| D452,859 | S | 1/2002 | Le Thellec | |
| 6,452,790 | B1 | 9/2002 | Chu et al. | |
| D475,691 | S | 6/2003 | Nishii et al. | |
| D483,344 | S | 12/2003 | Escorcia et al. | |
| D495,314 | S | 8/2004 | Mizokawa et al. | |
| D495,315 | S | 8/2004 | Mizokawa et al. | |
| D533,536 | S | 12/2006 | Mizokawa | |
| D533,860 | S | 12/2006 | Mizokawa | |
| D536,316 | S | 2/2007 | Mizokawa | |
| D554,089 | S | 10/2007 | Takahashi | |
| 7,668,576 | B2 | 2/2010 | Ellenbogen et al. | |
| D636,361 | S | 4/2011 | Frandsen et al. | |
| 9,262,958 | B2 | 2/2016 | Frandsen et al. | |
| 9,824,635 | B2 | 11/2017 | Frandsen et al. | |
| 9,852,692 | B2 | 12/2017 | Frandsen et al. | |
| 2001/0026446 | A1 | 10/2001 | Yoshida | |
| 2003/0028659 | A1 | 2/2003 | Mesarina et al. | |
| 2003/0100963 | A1 | 5/2003 | Potts et al. | |
| 2004/0008116 | A1 | 1/2004 | Goehring | |
| 2005/0012471 | A1 | 1/2005 | Burau et al. | |
| 2005/0185113 | A1 | 8/2005 | Weindorf et al. | |
| 2006/0256073 | A1 | 11/2006 | Satanek | |
| 2007/0019426 | A1 * | 1/2007 | Uken | B60R 1/12 362/494 |
| 2007/0085784 | A1 * | 4/2007 | Liu | G09G 3/30 345/77 |
| 2007/0132572 | A1 | 6/2007 | Itoh et al. | |
| 2007/0210747 | A1 | 9/2007 | Brandon et al. | |
| 2007/0294640 | A1 | 12/2007 | Eskelinen et al. | |
| 2008/0036574 | A1 * | 2/2008 | Andersen | H04B 17/23 340/326 |
| 2008/0049949 | A1 | 2/2008 | Snider et al. | |
| 2008/0243419 | A1 | 10/2008 | Nussbacher et al. | |
| 2009/0051713 | A1 | 2/2009 | Kim | |
| 2009/0059018 | A1 | 3/2009 | Brosnan | |
| 2009/0085847 | A1 * | 4/2009 | Morisue | G09G 3/3406 345/88 |
| 2009/0156251 | A1 | 6/2009 | Cannistraro et al. | |
| 2009/0174664 | A1 | 7/2009 | Han | |
| 2009/0245803 | A1 | 10/2009 | Garner et al. | |
| 2010/0141565 | A1 | 6/2010 | Frandsen et al. | |
| 2016/0196784 | A1 | 7/2016 | Frandsen et al. | |
| 2016/0198540 | A1 | 7/2016 | Frandsen et al. | |
| 2018/0158416 | A1 | 6/2018 | Frandsen et al. | |

OTHER PUBLICATIONS

Motorola Astro XTL 5000 Digital Mobile Radio, O5 Control Head, Installation Manual, Jun. 10, 2005 (44 pages).
IC-F320 VHF Mobile Transceiver [online], [retrieved on Mar. 2005]. Retrieved from Internet, <URL:http://www.ntfc.ca>.
Motorola PMI500, [online], [retrieved on Apr. 8, 2009]. Retrieved from Internet, <URL:http://www.talktwoway.com>.
Yaesu FT-8800R VHF/UHF Mobile Dual-Band Radio, [online], [retrieved on Jan. 6, 2010]. Retrieved from Internet, <URLhttp://www.twowayradioonline.com>.
U.S. Appl. No. 12/614,348; Office Action dated Jun. 6, 2013.
U.S. Appl. No. 12/614,348; Response to Office Action, dated Sep. 6, 2013.
U.S. Appl. No. 12/614,348; Office Action dated Oct. 7, 2013.
U.S. Appl. No. 12/614,348; Response to Office Action, dated Mar. 3, 2014.
U.S. Appl. No. 12/614,348; Final Office Action dated Apr. 2, 2014.
U.S. Appl. No. 12/614,348; Response to Final Office Action, dated Jul. 1, 2014.
U.S. Appl. No. 12/614,348; Advisory Action and Examiner-Initiated Interview Summary, dated Jul. 30, 2014.
U.S. Appl. No. 12/614,348; Response to Advisory Action, dated Aug. 4, 2014.
U.S. Appl. No. 12/614,348; Office Action dated Aug. 19, 2014.
U.S. Appl. No. 12/614,348; Response to Office Action, dated Dec. 19, 2014.
U.S. Appl. No. 12/614,348; Final Office Action dated Jan. 12, 2015.
U.S. Appl. No. 12/614,348; Response to Final Office Action, dated Jul. 12, 2015.
U.S. Appl. No. 12/614,348; Notice of Allowance dated Oct. 6, 2015.
Copending U.S. Appl. No. 14/989,715, filed Jan. 6, 2016; first-named inventor: Frandsen.
U.S. Appl. No. 14/989,664; Non-Final Office Action dated May 31, 2016.
U.S. Appl. No. 14/989,664; Response to Non-Final Office Action dated May 31, 2016, filed Oct. 31, 2016.
U.S. Appl. No. 14/989,664; Final Office Action dated Feb. 2, 2017.
Copending U.S. Appl. No. 14/989,664, filed Jan. 6, 2016; first-named inventor: Frandsen.
U.S. Appl. No. 14/989,715; Non-Final Office Action dated May 2, 2017.
U.S. Appl. No. 14/989,664; Response to Final Office Action dated Feb. 2, 2017, filed May 2, 2017.
U.S. Appl. No. 14/989,715; Response to Non-Final Office Action dated May 2, 2017, filed Jul. 12, 2017.
U.S. Appl. No. 14/989,664; Notice of Allowance dated Jul. 17, 2017.
U.S. Appl. No. 15/853,492, Advisory Action dated Sep. 3, 2019, 6 pgs.
U.S. Appl. No. 15/853,492; Non-Final Office Action dated Dec. 20, 2018, 14 pgs.

(56) References Cited

OTHER PUBLICATIONS

U.S. Appl. No. 15/853,492, Notice of Allowance dated Oct. 17, 2019, 9 pgs.

* cited by examiner 108  126 128   116   118   120   122   124   114  130

| Icon | Description |
|---|---|
|  | Keypad programming/edit mode. Displayed when the radio is in a mode where you can edit radio settings |
|  | Monitor mode enabled |
|  | Repeater Talk-Around mode enabled |
|  | Scan Enabled |
|  | Security Enabled |
|  | The current channel is in the enabled scan list (only when scan is on or when in scan edit mode) |
|  | The current channel is the priority channel in the enabled scan list (only when scan is on or when in scan edit mode) |
|  | The current channel is the priority 2 channel in the enabled scan list (only when scan is on or when in scan edit mode) |
|  | Interconnect mode enabled |
|  | Private call mode enabled |
|  | Radio is in Roaming mode (only used with Multi-Net trunking) |
|  | P25 data context enabled (radio is ready for data operations) |
|  | P25 data channel grant (radio is operating on a data channel) |
|  | Site lock mode |
|  | Multi-Net trunking group scan enabled |
|  | Signal strength (indicates an acceptable site, and may range from 4 bars to no bars) |
|  | GPS link active |
|  | Call history (only when radio is in conventional unit call, call alert or text messaging and an applicable unit ID is selected |
|  | Text message mode active |
|  | Radio wide scan mode enabled |
|  | Busy (displayed when radio enters a busy transmit state) |

FIG. 6

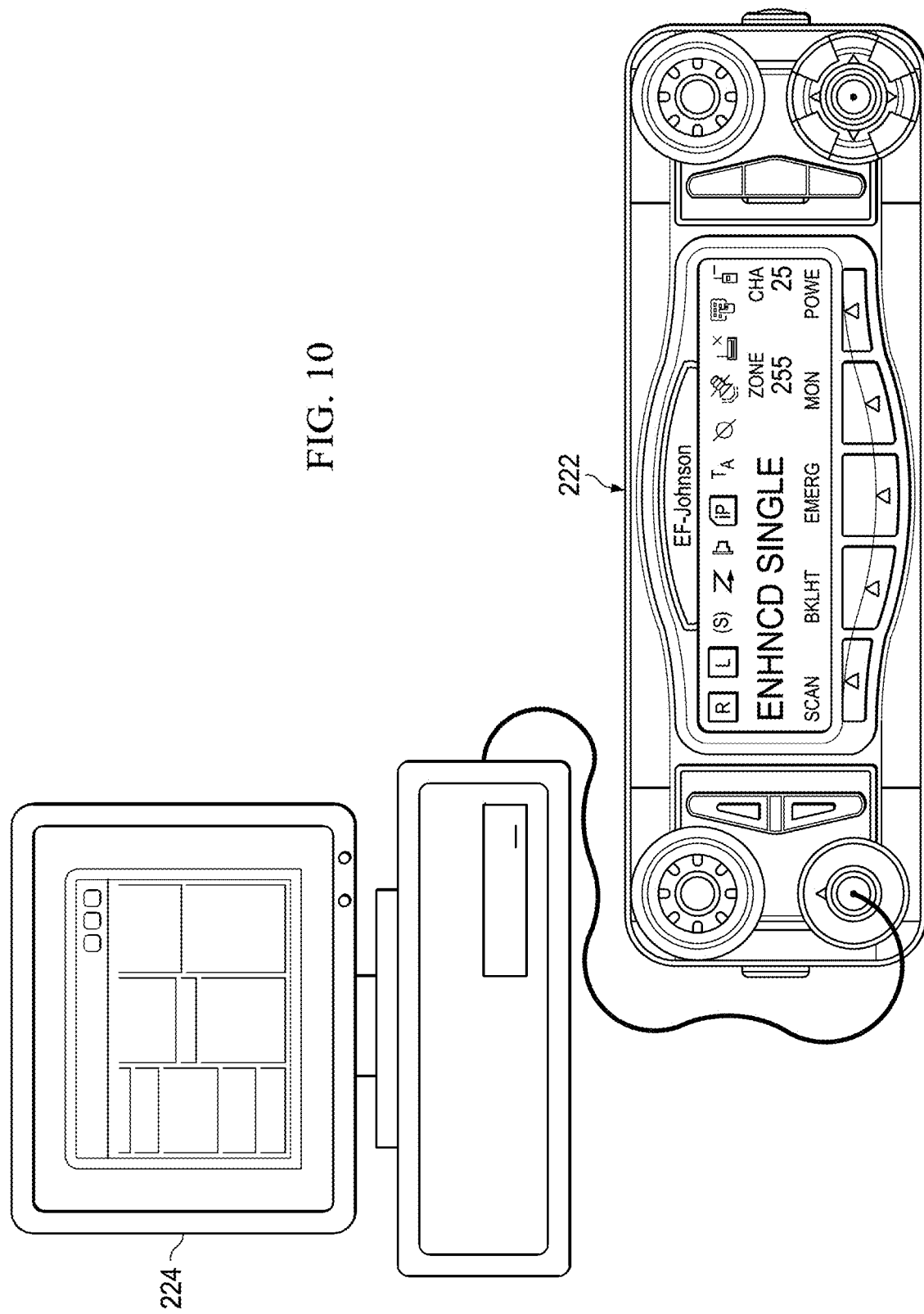

CONTROL HEAD WITH ELECTROLUMINESCENT PANEL IN LAND MOBILE RADIO

CROSS-REFERENCE TO RELATED APPLICATIONS

Pursuant to 35 U.S.C. § 120, this application is a continuation application claiming priority to U.S. patent application Ser. No. 14/989,664, entitled "Control Head With Electroluminescent Panel in Land Mobile Radio," which is a divisional application claiming priority to U.S. patent application Ser. No. 12/614,348, entitled "Control Head with Electroluminescent Panel in Land Mobile Radio," filed Nov. 6, 2009, which claims the benefit of U.S. Provisional Patent Application Ser. No. 61/112,086, entitled "Control Head with Electroluminescent Panel in Land Mobile Radio," filed Nov. 6, 2008, all of which are incorporated herein by reference for all purposes.

TECHNICAL FIELD

The present disclosure relates generally to the field of land mobile radio and more particularly, but not by way of limitation, to a control head having an electroluminescent panel.

BACKGROUND

Land Mobile Radio (LMR) systems are deployed by organizations requiring instant communication between geographically dispersed and mobile personnel. Typical users of LMR systems include police departments, fire departments, medical personnel, EMS and the military.

SUMMARY

According to an exemplary aspect of the present disclosure, a control head for land mobile radio comprises an electroluminescent panel. As described below, it comprises several aspects capable of enabling one or more of a multitude of advantages and benefits.

One technical aspect of the exemplary control head may be the capability to utilize halo light of the control head to implement a multi-function indicator that communicates a state of the land mobile radio.

Another aspect may be the capability to buffer images constructed from data received from the land mobile radio into a video stream for rendering on an electroluminescent display.

Another aspect may include the capability for a user to modify a configuration stored on the land mobile radio that defines one of several display modes to be utilized in generating data for use in forming images to be rendered on an electroluminescent display.

Other technical advantages may be readily apparent to one skilled in the art after review of the following figures and description associated herewith.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts, in which:

FIG. 6 is a list of symbols that may be used on the display to indicate various operating modes and status.

FIG. 10 is a perspective view illustrating programming of a configuration of a control head utilizing a computer processor.

DETAILED DESCRIPTION

It should be understood at the outset that although exemplary implementations of the present disclosure are illustrated below, the present disclosure may be implemented using any number of techniques, whether currently known or in existence. The present invention should in no way be limited to the exemplary implementations, options, drawings, and techniques illustrated below, including the exemplary design and implementation illustrated and described herein. Additionally, the drawings contained herein are not necessarily drawn to scale.

Figure 1:
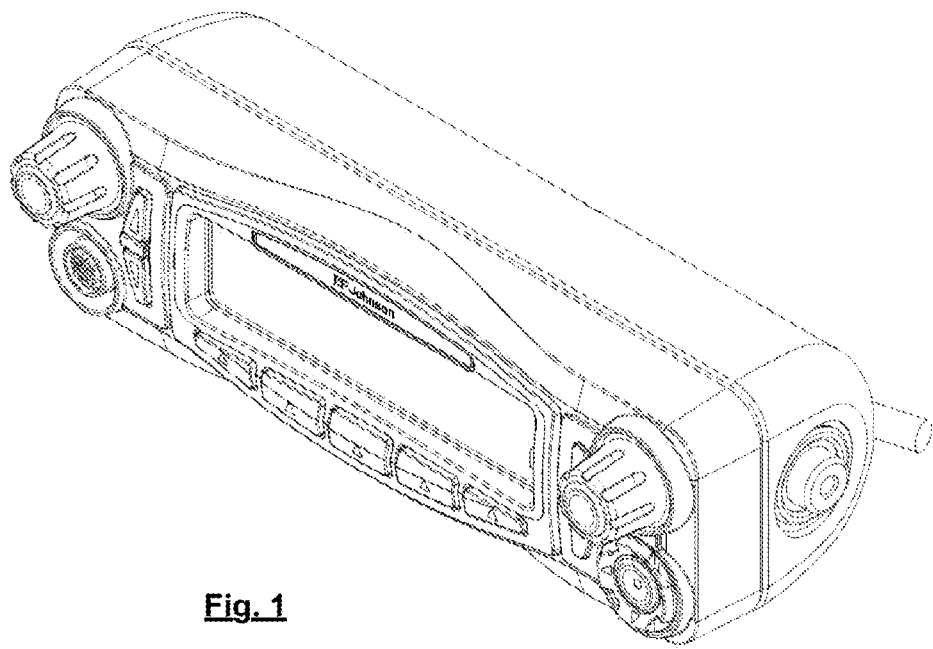
FIG. 1 is a perspective view of a control head remote from a land mobile radio.
Figure 2:
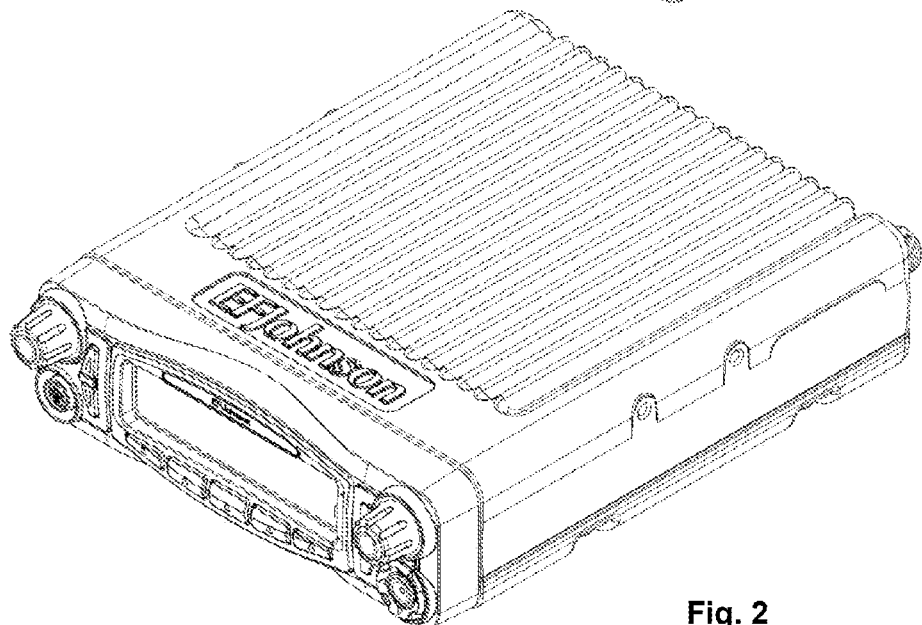
FIG. 2 is a perspective view of a control head attached to or integrated with a land mobile radio.

A component for land mobile radios is a control head that offers superior readability and display options for the radio user. Referring to FIG. 1, the control head can be fitted to a remote mount in a land mobile radio installation. Alternatively, referring to FIG. 2, the control head can be fitted or integrated as a dash mount in a land mobile radio installation.

Figure 3:
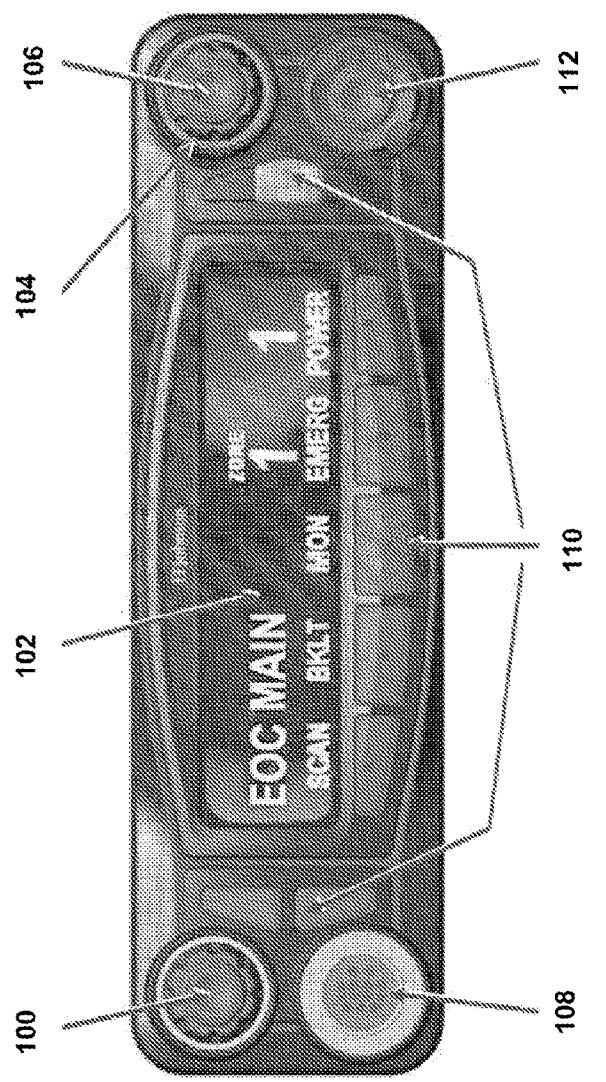
FIG. 3 is a frontal view of an electroluminescent panel of a control head.

Turning to FIG. 3, the front panel of the control head can have multiple features. For example, it can have an on-off/volume switch 100 for turning the power on/off function to the radio. When the power is on, this control can be rotated to adjust the radio speaker volume. Also, an electroluminescent display 102 can show all primary operating information, such as active channel, zone, channel/zone alias, status symbols, and labels for the function buttons under the display. In the embodiment shown in FIG. 3, five buttons are provided under the display on the control head. Additionally, a multi-function indicator 104 can be provided in which halo light surrounding a button or switch, such as a select zone/channel switch 106, is used to indicate radio transmit and receive status. A steady red halo, in one embodiment, may indicate that the radio is transmitting, while a steady green halo may indicate that the radio is receiving, and a steady amber halo may indicate that the radio is idle. Further, the select zone/channel switch 106 may be implemented with two actions: rotation and press. In normal nonmenu mode, pressing the control can select either the zone or the channel. Then, rotation of the control can change either the zone or channel. An indication can be provided on the display whether zone or channel is selected. Yet further, a microphone connection 108 can be provided that allows a compatible microphone to plug into this jack connector. Further still, the control head can have a number, such as eight, one-touch buttons 110, including two on the left of the display, five under the display, and an orange button on the right of the display. These buttons in certain embodiments may be programmed with different radio functions. Finally, a 4-way navigation pad 112 may be provided for navigating through various radio functions and menus. In other embodiments the navigation pad 112 may be implemented with either more or less than a 4-way pad. Like the buttons 110, the pad 112 can be programmed with different radio functions.

Figure 4:
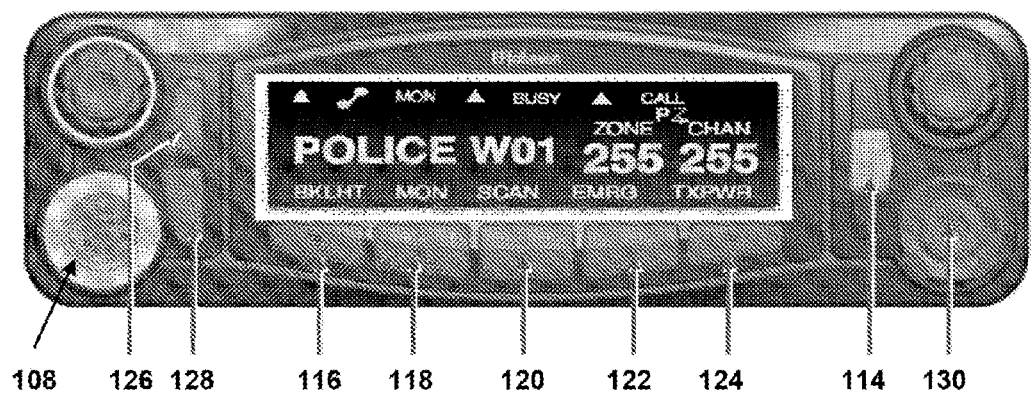
FIG. 4 is another frontal view of the electroluminescent panel of a control head.

Turning now to FIG. 4, as mentioned above, the control head can have a number, such as nine, of programmable controls 114-130. A number of land mobile radio functions can be assigned to these buttons using a computer processor that connects to the land mobile radio control head via the microphone connection 108. Example radio functions that the user can configure include scan, backlight level, monitor, emergency, and transmitter power.

Figure 5:
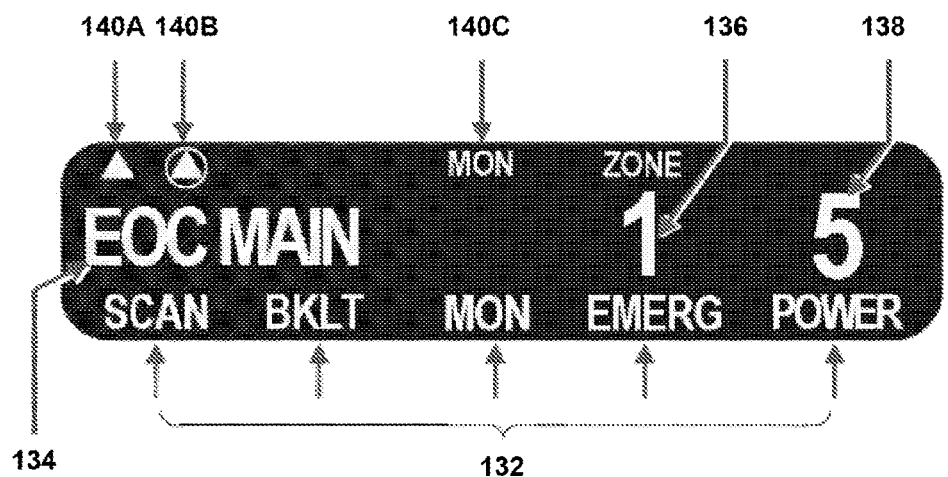
FIG. 5 is a view of a display of a control head.

Referring now to FIG. 5, an advantageous feature of the control head is a highly readable electroluminescent display. In some embodiments, the display is a monochrome display with 320×80 pixels. This display can support a Classic Single Line display mode familiar to users of previous types of land mobile radio control head displays. In Classic Single Line display mode, the display can have primary fields corresponding to the fields available on earlier model(s) of control heads, but with the addition of the soft menu keys and display of labels 132 of functions assigned to those soft menu keys as described above. More familiar display contents include channel name 134, zone number 136, channel number 138, and symbols 140A-140C to indicate operating mode and status. A list of symbols used on the display to indicate various operating modes and status that may be implemented in certain embodiments is provided in FIG. 6.

The electroluminescent display panel provides a clear, bright and readable display, which is advantageous in public safety applications. In some embodiments, the electroluminescent display features high brightness and contrast, resists fading, provides long operating life, has a viewing angle greater than 160°, and provides 200G shock durability. Furthermore, the electroluminescent display incorporates, in some embodiments, emissive pixel technology, which makes small text more legible. The electroluminescent display may be operated in a reflective mode to provide crisp, clear viewing of the electroluminescent display in bright light, even through polarized lenses. Additionally, the size of alphanumeric characters presented on the electroluminescent display may be adjusted.

Figure 7:
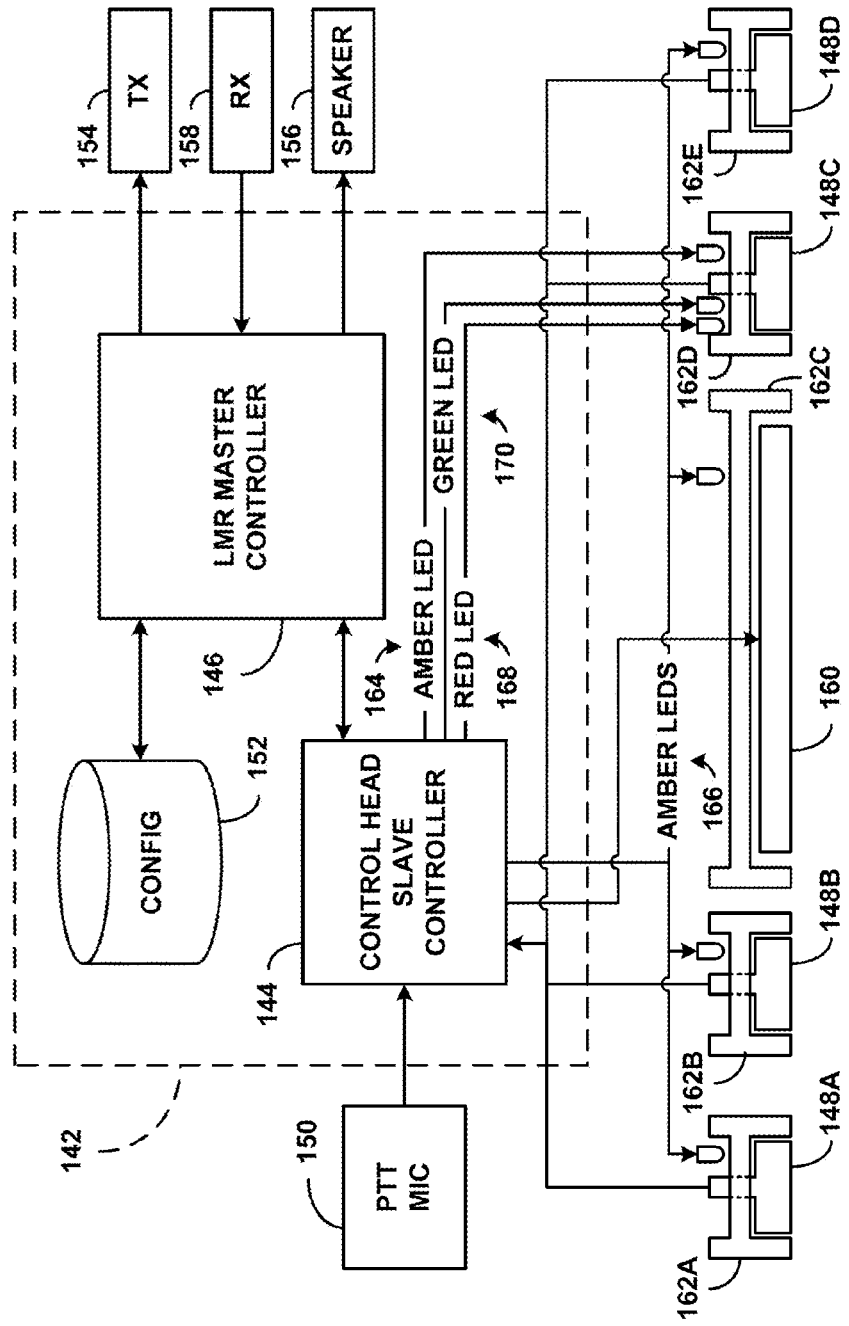
FIG. 7 is a functional block diagram illustrating a land mobile radio system implementing a control head.

Turning now to FIG. 7, a land mobile radio system 142 generally has a control head controller 144 that operates as a slave to a land mobile radio master controller 146. The control head controller 144 detects user actuations of controls 148A-148D and signals the master controller 146. Controller 144 also reacts to user actuation of a push to talk microphone by signaling transmission and passing the audio data.

The master controller 146 transmit audio data from microphone 150 via transmitter 154, and drive speakers 156 to output audio data received via receiver 158. Also, the master controller 146 constructs user interface data frame contents of electroluminescent display 160 in accordance with a configuration stored in data store 152. Additionally, the master controller 146 operates the UI in response to the user actuations at least partly in accordance with the configuration. Controller 144 constructs UI data received from master controller 146 into images that are buffered into a video stream for rendering on electroluminescent display 160.

Additional components of the control head operated by master controller 146 in accordance with the configuration include indicators, such as lights or LEDs, located behind light pipes 162A-162E. These light pipes provide halo light for controls 148A-148D, and for display 160. In one embodiment, each of the light pipes 162A-162E has an amber LED that provides the halo light at an intensity level recorded in the configuration, and that can be adjusted by user actuation of one of the controls 148A-148D, or another control. At least one of the light pipes additionally may include red and green LEDs collocated with its amber LED. A signal line 164 to that amber LED can be controlled independently of signal lines 166 to the other amber LEDs. The red and green LEDs may also have independently controllable signal lines 168 and 170.

Figure 8:
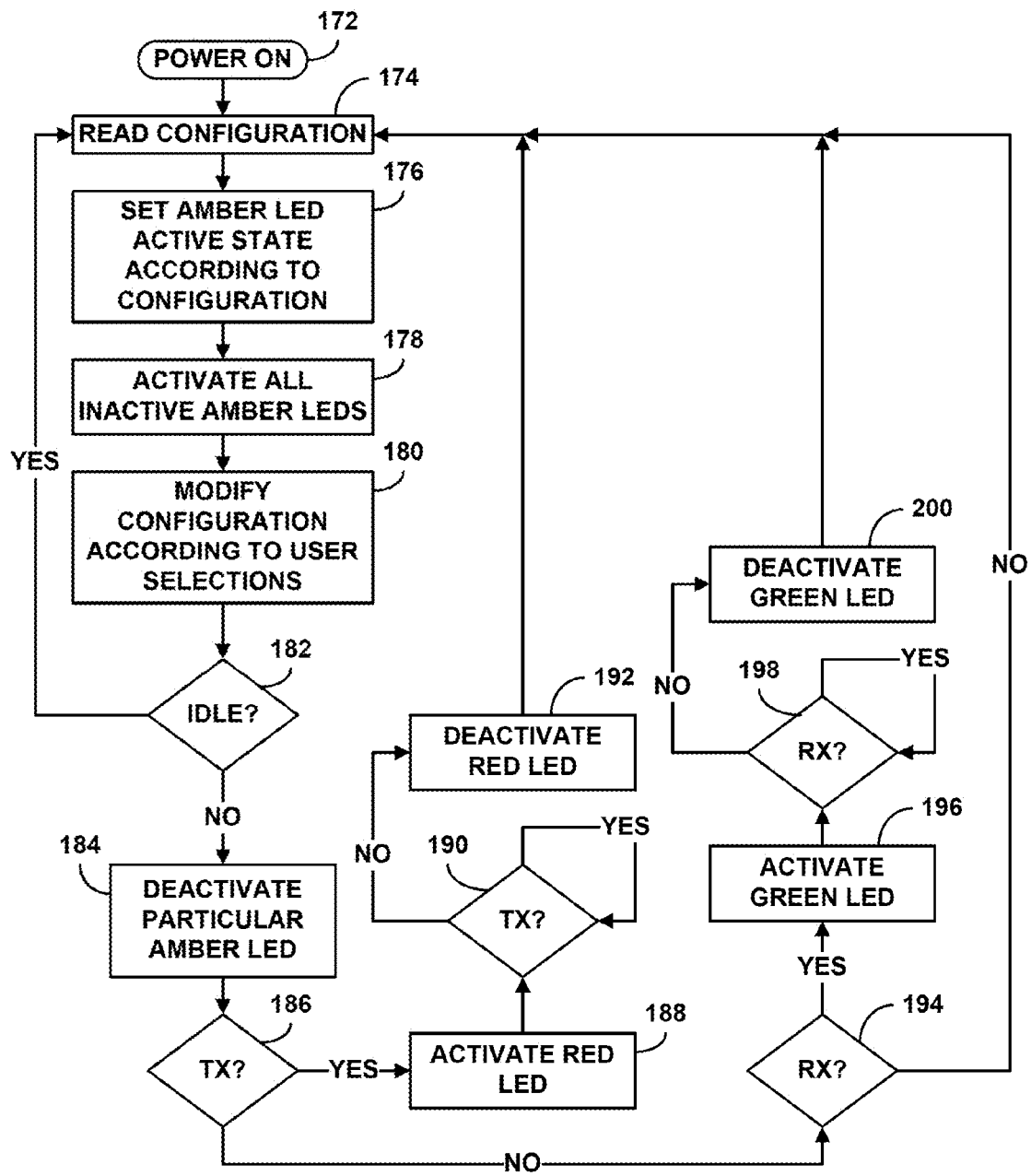
FIG. 8 is a flow diagram illustrating a method of operation for controlling a multi-function indicator implemented utilizing a halo light of a control head.

Turning now to FIG. 8, the controllers operate the LEDs according to a method that accomplishes indication of the LMR transmit/receive status. Beginning at power up 172, the configuration is read at step 174 to determine an intensity level for the amber LEDs, and an active state is set for the amber LEDs at step 176 according to the configuration. Next, one or all inactive amber LEDs may be activated at step 178. Thereafter, the user can adjust intensity of the LEDs by actuation of one of the controls of the control head, resulting in modification of the configuration according to the user selections at step 180. If the radio is determined to be idle at decision step 182, then processing may return to step 174 and steps 174-182 are traversed continually, resulting in adjustment of the intensity level of the amber LEDs according to the user selections.

When the radio is transmitting or receiving, this state change will be detected at step 182, resulting in deactivation at step 184 of the amber LED that is collocated with the red and green LEDs. Then, if the radio is determined to be transmitting at decision step 186, then the red LED, in one embodiment, is activated at step 188. Thereafter, as long as the radio is determined to still be transmitting at decision step 190, the red LED will remain active. Once a determination is made at step 190 that the transmission has ended, then the red LED is deactivated at step 192, and processing returns to step 174. Thereafter, the amber LED is reactivated at step 178 and remains active as long as the radio is determined to be idle at step 182.

Processing during a receive state similar to that during the transmit state. If the radio is determined to be receiving at decision step 194, then the green LED, in one embodiment, is activated at step 196, and it remains activated as long as the radio is determined to be receiving at decision step 198. Once the receipt is determined to have ended at step 198, the green LED is deactivated at step 200, and processing returns to step 174. Thus, a halo light behind one of the user interface components serves as a multifunction indicator without interfering with the halo function of the other components, and while allowing the intensity of the amber halo light of the components to be adjusted independently of the red and green indicator lights.

Figure 9A:
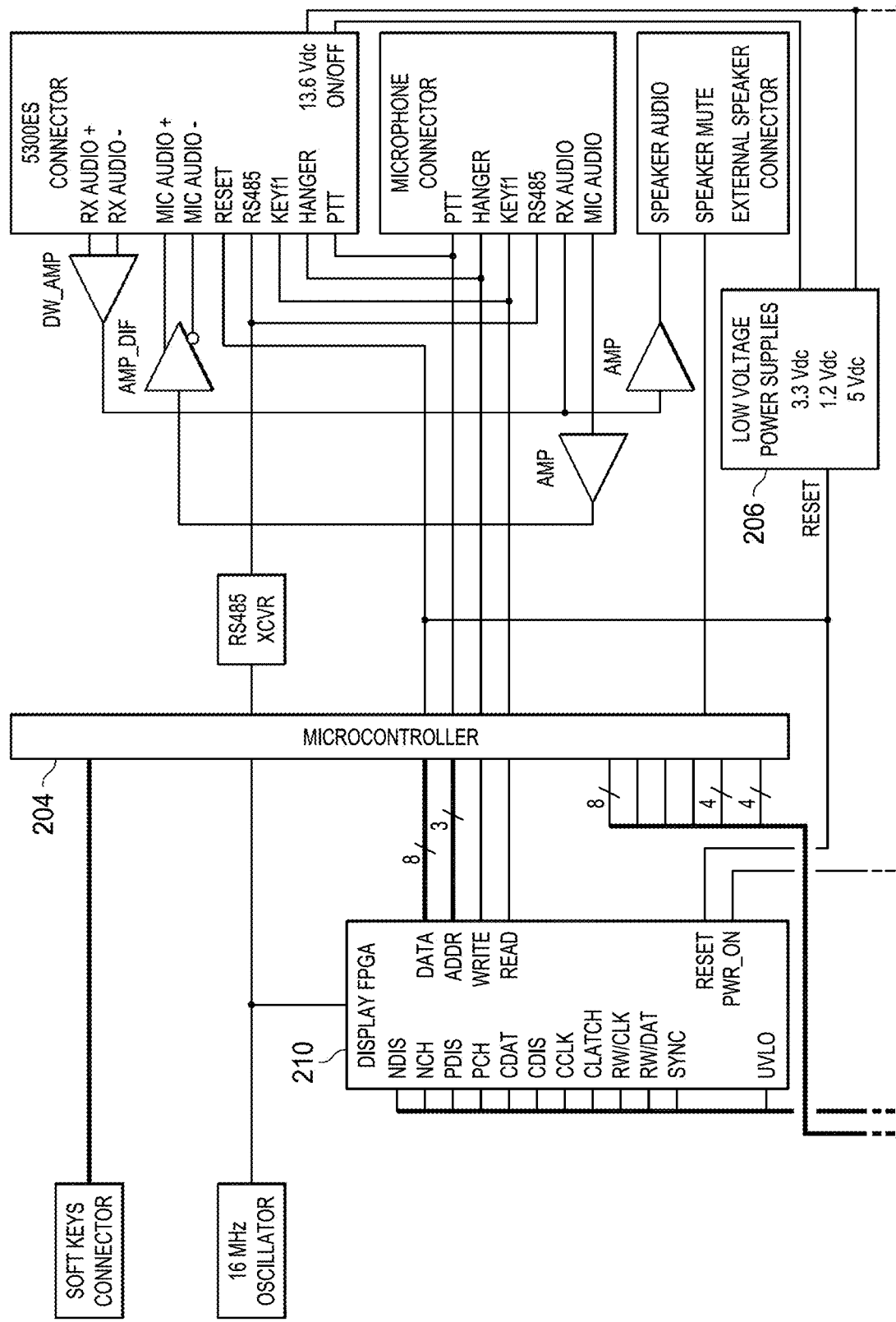
FIGS. 9A and 9B illustrate an electronic circuit diagram for a control head.
Figure 9B:
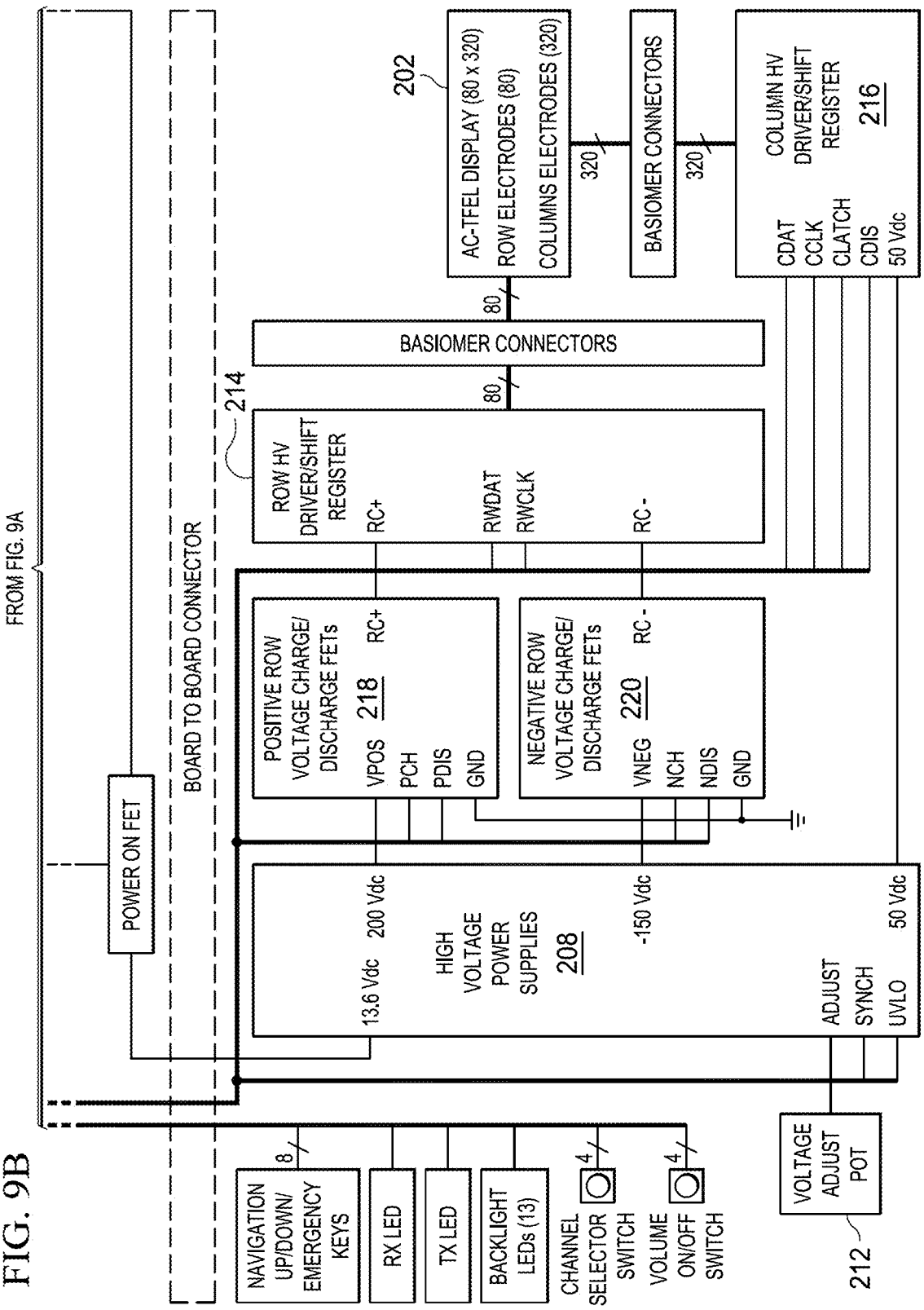

Turning now to FIGS. 9A and 9B, the control head display 202, in one embodiment, can be implemented as an alternating-current thin-film electroluminescent (AC-TFEL) display. In this case, the display glass panel can be covered by two sets of electrodes (80 row electrodes and 320 column electrodes) in the horizontal and vertical directions. The electrodes are separated by thin film insulating layers. The sensor layer can be a phosphor layer that emits light when exposed to a strong electric field. A single light emitting pixel is created at the intersection of each row and column electrode. The brightness of the pixel is determined by the voltage between the two electrodes. In other embodiments, the control head display 202 may be implemented using other known or available display technology.

The control head controller 204, in one embodiment, may be Freescale MC9S08QE128 which has internal FLASH and SRAM for program and data storage, general purpose I/O ports, and a UART port for communication with the master controller in the land mobile radio. In some embodiments, the control head controller 204 is configured to operate as a slave to the master controller in the land mobile radio for most I/O. In this case, it reports keypresses, switch changes, and microphone inputs to the master controller via RS485 serial data links. In one embodiment, the control head controller 204 does not act on these data. Similarly, control of LEDs and other output functions can be directed by the master controller. In one embodiment, the control head controller 204 formats the data, from the master controller, into a pixel image that is displayed on the AC-TFEL Display.

The low voltage power supply 206 can be one or more switching and low drop out linear regulators which provide power to the logic and analog circuits. Contained within this plot is a circuit that generates a reset signal if the battery (13.6 Vdc nominal) supply from the radio, the 3.3 Vdc supply, or 1.2 Vdc supply, for example, is out of tolerance.

The high voltage (HV) power supply 208 may be a PWM controlled flyback transformer design which provide nominal 220 Vdc, 50 Vdc, and −150 Vdc outputs to power the AC-TFEL Display. Input power to supply may be provided in one implementation from the radio battery supply (13.6 Vdc nominal) through a FET switch controlled by the Display FPGA 210. The output voltage levels can be adjusted by volume adjustment potentiometer 212 to set the brightness level of the AC-TFEL Display. The power supply switching frequency (150 kHz) is controlled by Display FPGA 210.

A display frame in one implementation may be composed of 80 lines of 320 bits (pixels) for a total of 25600 pixels per frame. In operation, a line of pixels (320) can be shifted into a Column HV Driver/Shift Register 216 and latched into output registers which control the outputs of the HV output drivers attached to the column electrodes on the AC-TFEL Display. A new line of pixels is shifted into the register 216 after the pixels for the line have been latched into the output registers.

When the column data is latched, a HV pulls from the Row HV Driver/Shift Register 214 can be applied to the AC-TFEL Display row electrode associated with that line of pixels. The HV pulse on the active row electrode is either 200 Vdc or −150 Vdc. A pixel will begin to emit light when the voltage across its row and column electrode exceeds approximately +/−180 Vdc. For a positive row voltage of pulse of 200 Vdc, a column voltage of 0 Vdc will light the pixel and a column voltage of 50 Vdc will turn it off. For a negative row voltage of pulse of −150 Vdc, a column voltage of 50 Vdc will light the pixel and a column voltage of 0 VDC will turn it off.

The Row HV Driver/Shift Register 214 may be loaded at the beginning of each frame, in one embodiment, with a seed bit that enables a single row HV driver output. After a row is pulsed, the seed bit is shifted to the next row to enable its HV driver output. The polarity of the row voltage pulse alternates with each line of pixels. The Positive Row Voltage Charge/Discharge FET 218 and Negative Row Voltage Charge/Discharge FET 220 circuits generate the HV pulses applied to the row electrode through the HV output drivers in the Row HV Driver/Shift Register 214 and discharge the electrode after the pulse has been applied.

The Display FPGA 210 controls the operation of the circuitry associated with the AC-TFEL Display 202 to display images on the display that are generated by the control head controller 204. Functionally the Display FPGA 210 contains a display data buffer, a frame timing generator, and display control logic to control operation of the Negative Row Voltage Charge/Discharge FET 220, Positive Row Voltage Charge/Discharge FET 218, Row HV Driver/Shift Register 214, and Column HV Driver/Shift Register 216.

The display buffer can be a 3200 byte dual port RAM that is accessed by the control head controller 204 to load pixel data for screen images and by the internal frame generator logic to read the pixel data. The control head controller can load data into the display buffer through an eight bit parallel data port. Two internal eight bit registers form the byte address of the display buffer to which the control head controller writes data. The control head controller 204 can load an address into these registers though through the eight bit parallel data port. The combined address register can be auto-incremented each time the control head controller 204 writes to the display buffer.

The frame timing generator can generate internal frame start, line start, pixel data, and pixel clock signals that are used by the display control logic to control the circuitry surrounding the AC-TFEL Display 202. The frame refresh rate can be controlled by register that is set by the control head controller 204 via the eight bit parallel data port.

The display control logic can use the framing, clock, and pixel data from the frame timing generator to generate the actual signals used by the AC-TFEL Display electronics. This signal generation can include timing for HV row charge/discharge pulses, shifting and latch column and row data, and alternating polarity of row charge/discharge pulses. Additionally, the display control logic can provide for an orderly start up/shut down of the AC-TFEL Display 202 after reset or if the High Voltage Power Supply 208 is in an under voltage condition.

Turning now to FIG. 10, the display mode of the land mobile radio 222 can be programmed by the end user, in one implementation, employing a computer processor 224 to define a display configuration of the land mobile radio 222.

To this end, the computer processor 224 can communicate with the land mobile radio 222 by a cable that connects to the microphone port on the control head. The computer processor 224 runs a program that allows the user to define the configuration stored in a processor memory of the radio through a set of menus. By defining this configuration, a number of different display modes can be realized.

Figure 11:
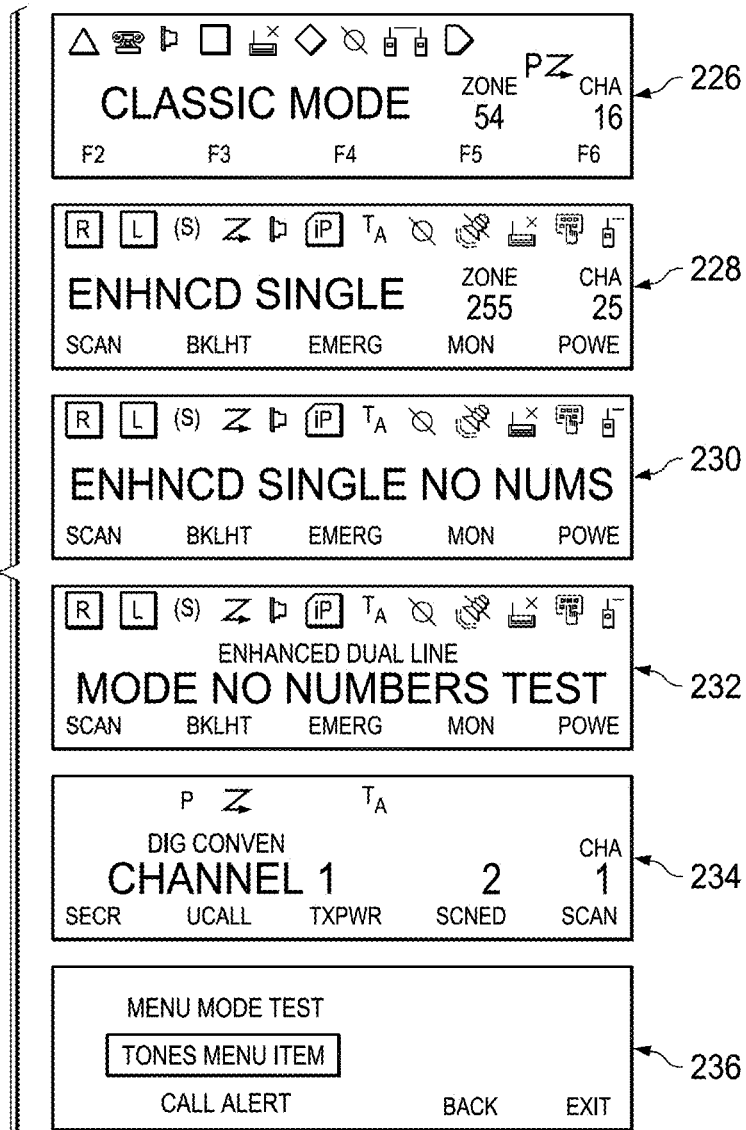
FIG. 11 is a set of views illustrating results of varying configurations of a control head to provide different display modes.

Turning to FIG. 11, there are a variety of display modes that can be available in some embodiments. For example, a classic mode 226 can be available that provides a display mode like that provided by previous land mobile radios not having electroluminescent displays. There can also be an enhanced single line mode 228 with zone/channel display similar to that of the classic mode, but with soft key function labels and additional or different symbols or indicating operational modes and statuses of the radio.

Another display mode 230 can be an enhanced single line mode in which display of zone and channel is inhibited, permitting display of additional text. An additional display mode 232 can be an enhanced dual line display mode allowing display of even more text with zone and channel display inhibited.

Yet another display mode 234 can be a dual line display mode in which zone and channel are displayed. Finally, an enhanced menu 236 can be displayed with user configurable options that are navigable by use of a control on the control head. These modes can be selected by the user selecting options for controller head type, whether to inhibit zone/channel display, a classic versus enhanced display mode, and if in the enhanced mode, whether to exercise the option to display two lines of text, as indicated below in table 1.

TABLE 1

| | Control Head Type Normal/Lightning | Inhibit Zone Chan Indicator Checkbox | Display Mode Standard/ Enhanced |
|---|---|---|---|
| Classic with Zone Chan | Normal | Off | Standard |
| Classic without Zone Chan | Normal | On | Standard |
| Enhanced Single with Zone/Chan | Lightning | Off | |
| Enhanced Single without Zone Chan | Lightning | On | |
| Enhanced Dual with Zone/Chan | Lightning | Off | |
| Enhanced Dual without Zone/Chan | Lightning | On | |

Figure 12:
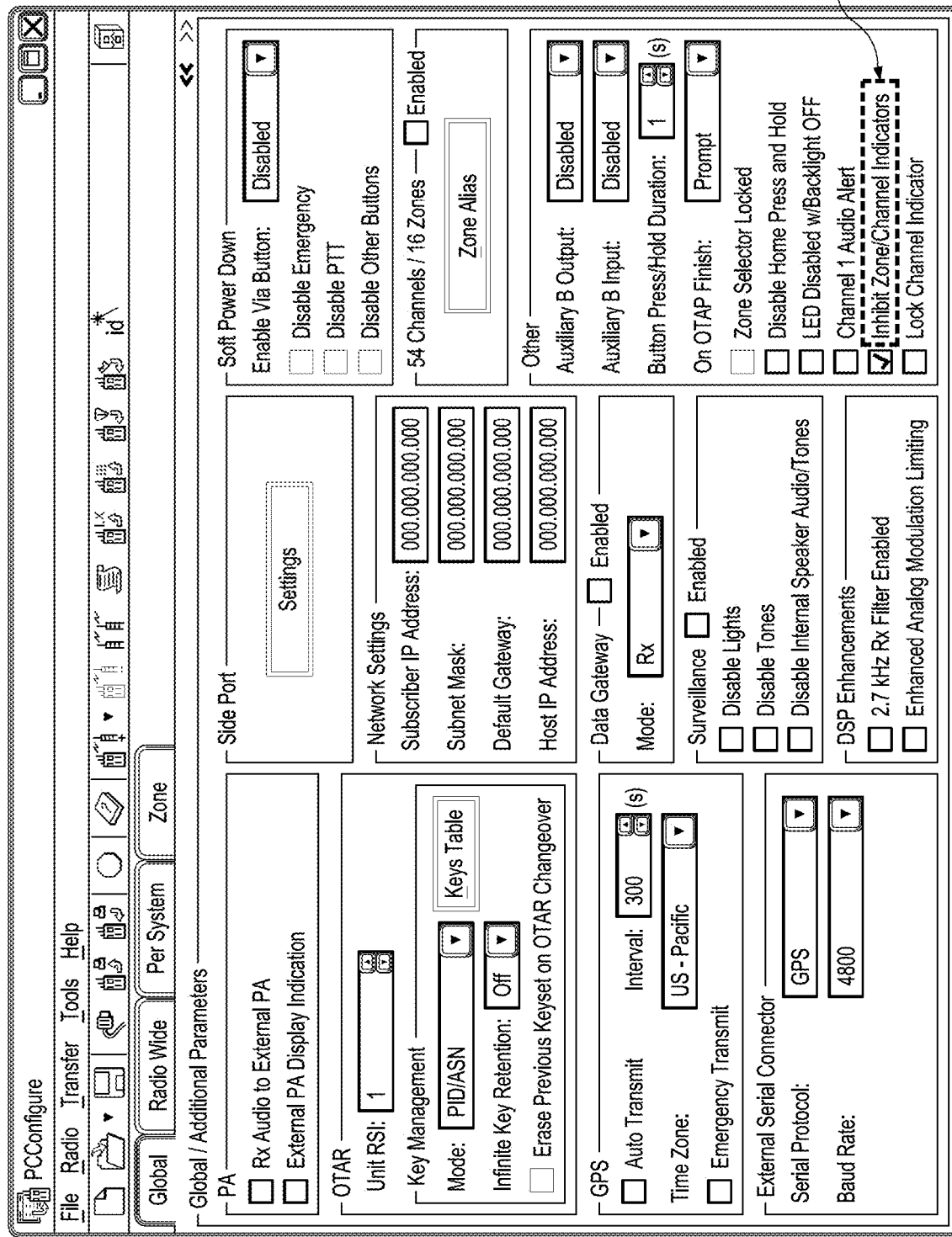
FIG. 12 is a screenshot illustrating a user interface component whereby a selection is made for the control head configuration whether to inhibit a zone/channel indicator.
Figure 13:
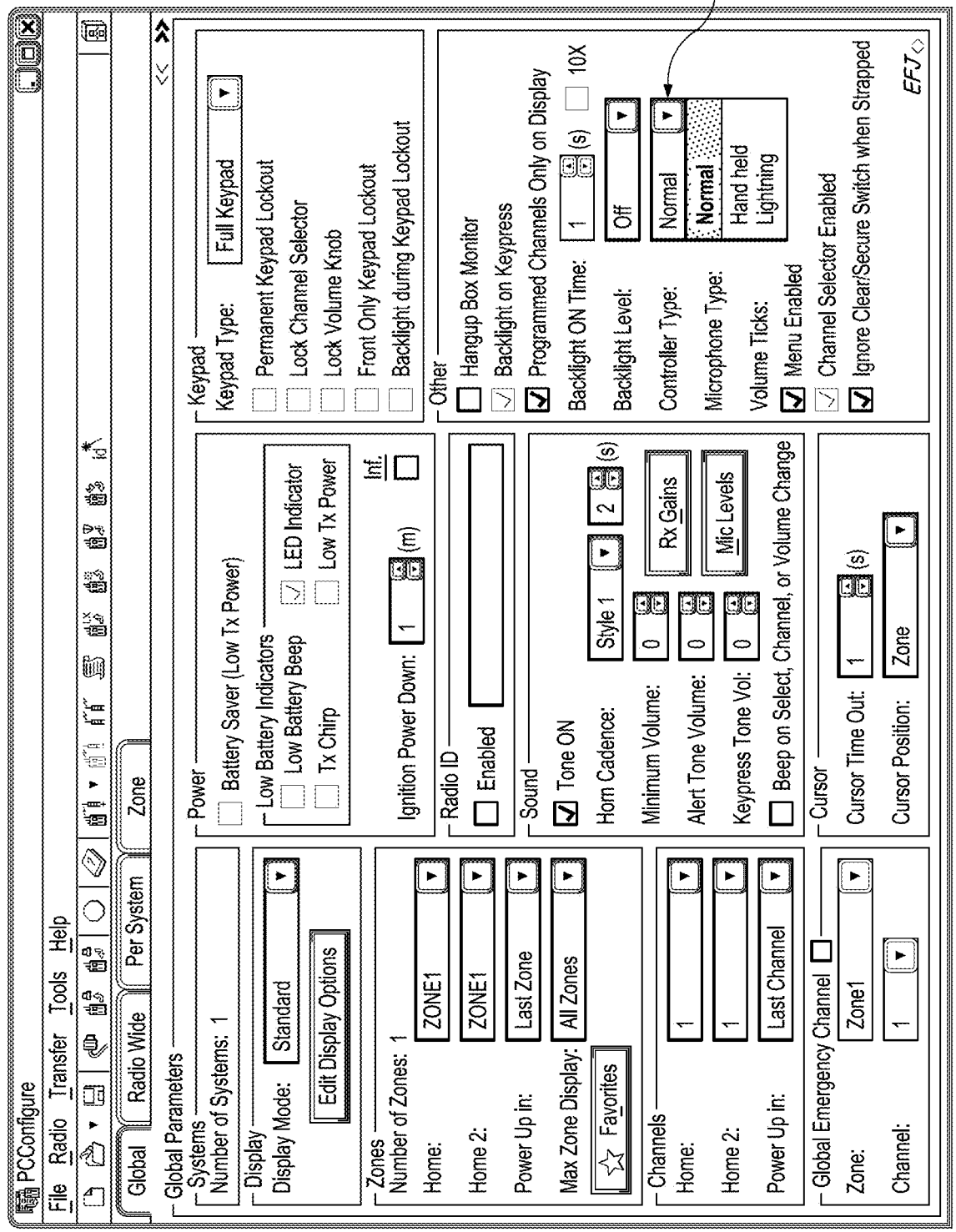
FIG. 13 is a screenshot illustrating a user interface component whereby a selection is made for a control head configuration of a controller head type.
Figure 14:
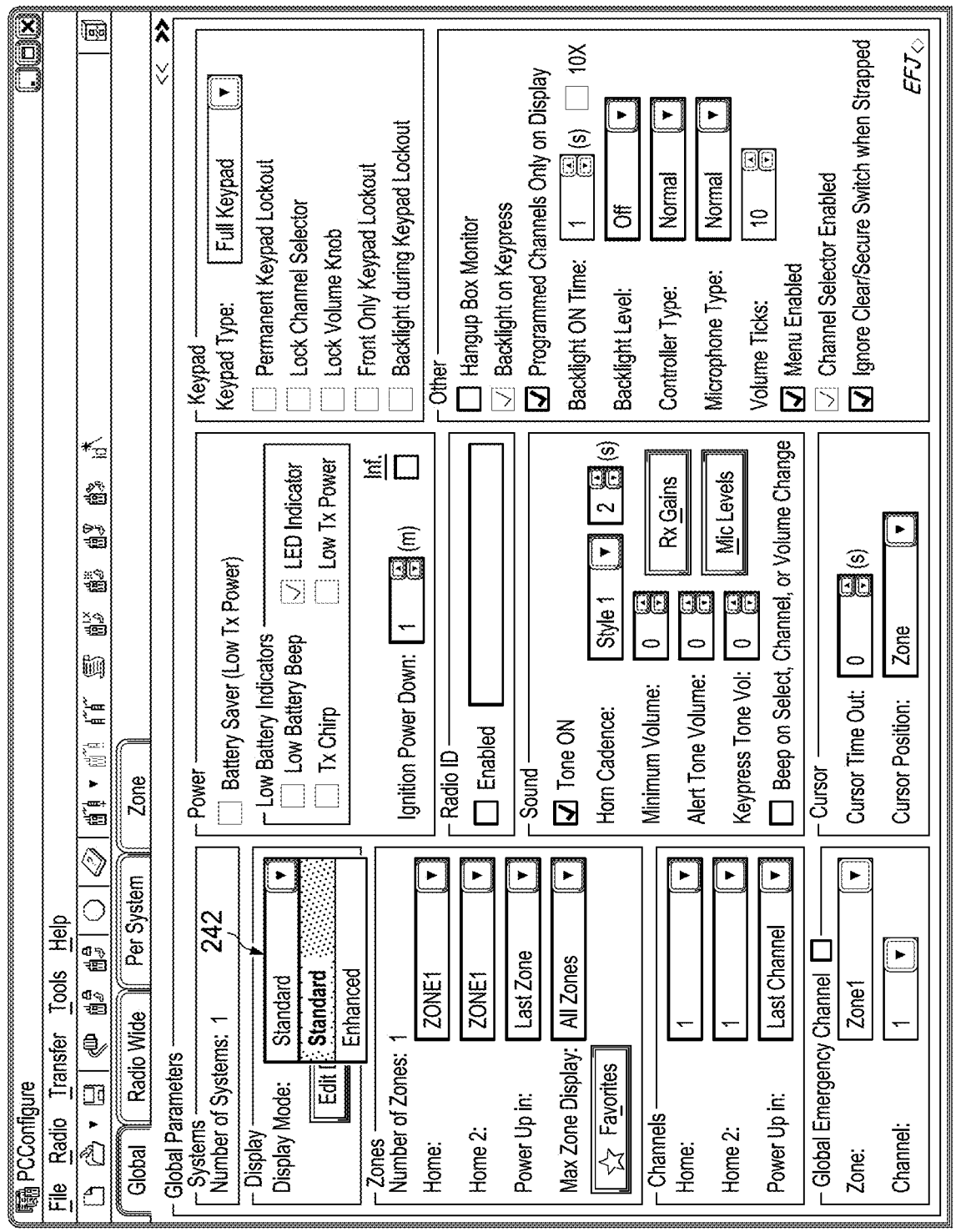
FIG. 14 is a screenshot illustrating a user interface component whereby a selection is made for a control head configuration of a display mode.
Figure 15:
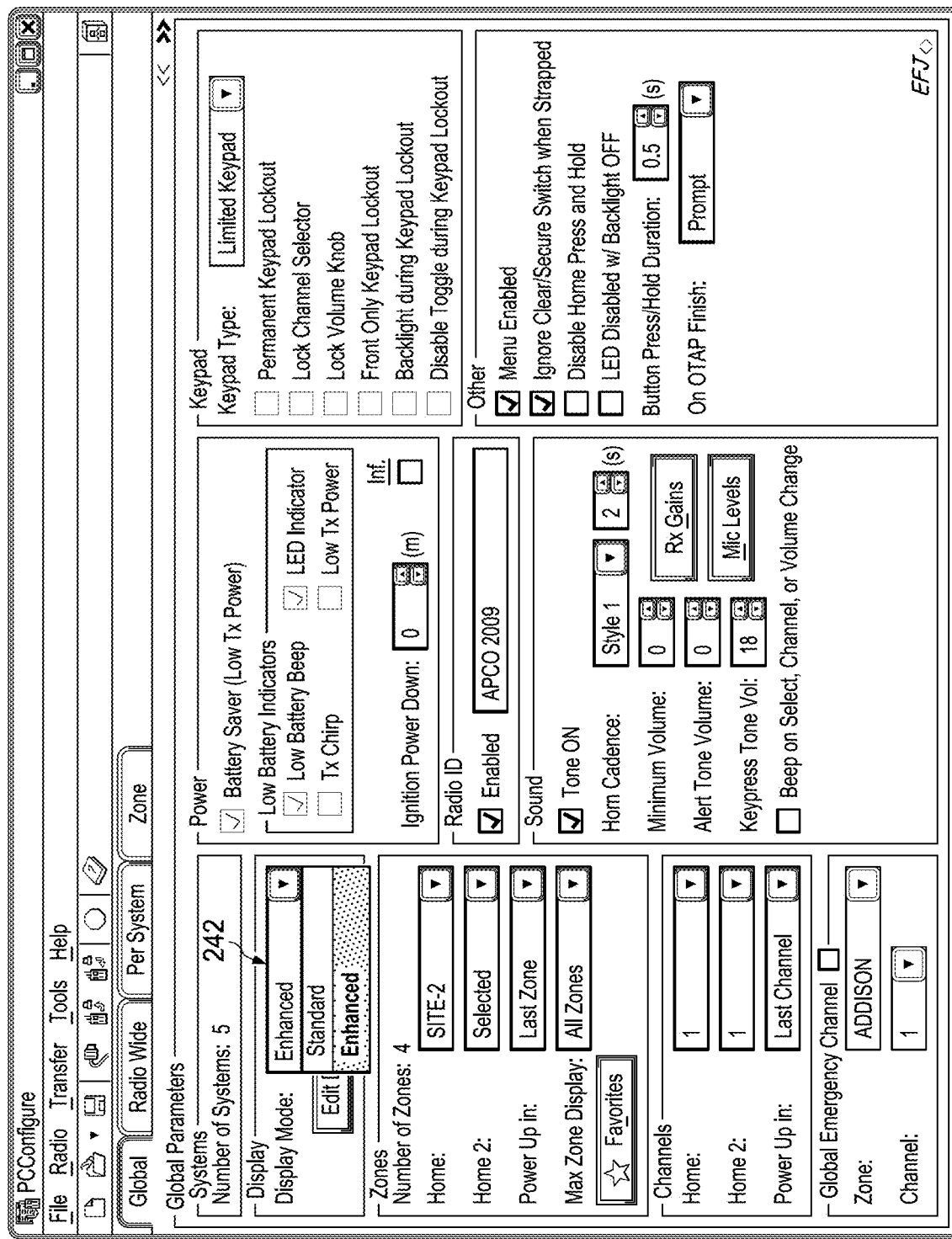
FIG. 15 is a screenshot illustrating the user interface component of FIG. 14 whereby another selection is made for the control head configuration of a different display mode.
Figure 16:
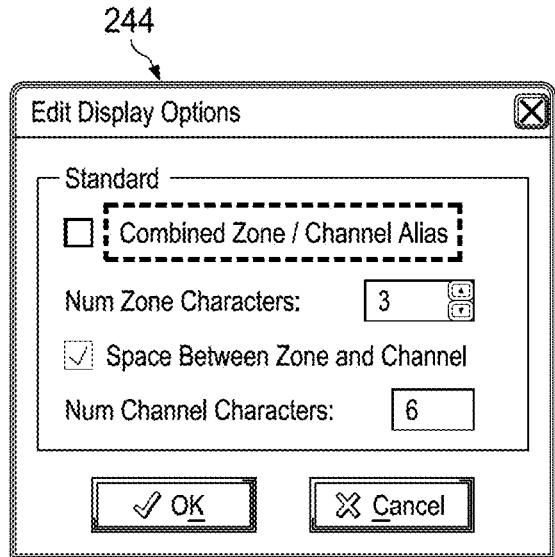
FIG. 16 is a screenshot illustrating a user interface component whereby a selection is made for a control head configuration of display options for the display mode selected in FIG. 14.
Figure 17:
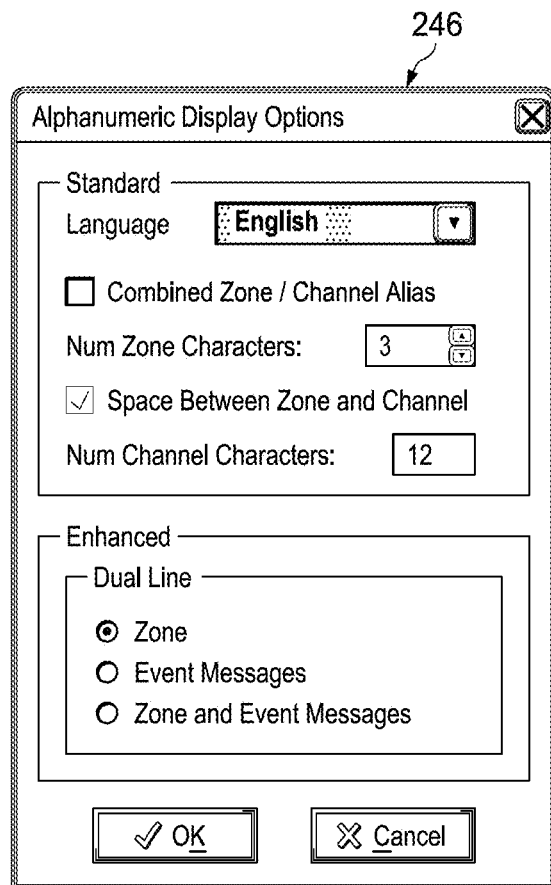
FIG. 17 is a screenshot illustrating a user interface component whereby a selection is made for a control head configuration of display options for the display mode selected in FIG. 15.

There are a number of menus that allow the user to configure the display mode of the control head in addition to other functions of the radio. For example, turning to FIG. 12, one of the menus that allows the user to make a selection for configuring the display mode can contain a checkbox 238 for exercising an option to inhibit the zone/channel indicator. Selecting this checkbox can inhibit the display of the zone/channel indicator even in the classic mode. Also, turning to FIG. 13, a controller type drop down menu 240 can allow the user to select controller type. Turning to FIGS. 14 and 15, a display mode drop down menu 242 allows the user to select a standard or enhanced display mode, which can affect options provided for configuring the radio. Some of these options relate to display options. For example, turning to FIGS. 16 and 17, display options 244 for the standard display mode do not permit selection to display two lines of text. In contrast, the display options 246 in the enhanced mode permit selection to display two lines of text.

Thus, it is apparent that there has been provided, in accordance with the present disclosure, a control head that satisfies one or more of the advantages that forth above. Although the preferred embodiment has been described in detail, it should be understood that various changes, substitutions, and alterations can be made herein without departing from the scope of the present disclosure, even if all of the advantages and benefits identified above are not present. For example, the various embodiments and examples shown in the drawings and descriptions provided herein illustrate that the present disclosure may be implemented and embodied in numerous different ways that still fall within the scope of the present disclosure, whether expressly shown herein or not. For example, the various elements or components may be combined or integrated in another system or certain features may not be implemented. Also, the techniques, systems, sub-systems, and methods described and illustrated in the preferred embodiment discrete or separate may be combined or integrated with other systems, designs, techniques, or methods without departing from the scope of the present disclosure. For example, the control head can be used with a wide variety of types of LMR systems and networks, including those not specifically discussed herein. Other examples of changes, substitutions, and alterations are readily ascertainable by one skilled in the art and could be made without departing from the spirit and scope of the present disclosure.

The invention claimed is:

1. A control head of a land mobile radio, the control head of the land mobile radio comprising:
   a plurality of function buttons;
   an electroluminescent display showing a symbol indicating an operating status of the land mobile radio and showing labels for the plurality of function buttons, wherein the function buttons are positioned separate from and under the electroluminescent display;
   a control head controller configured to receive data to construct the data into one or more images; and
   a video driver connected to the control head controller and buffering the one or more images into a video stream for rendering on the electroluminescent display,
   wherein the one or more images comprises the labels and the symbol,
   wherein the one or more images comprising the labels is displayed continuously,
   wherein the one or more images comprising the symbol is selectably displayed in response to a change in a state of the land mobile radio,
   wherein the control head controller is further configured to detect the change in the state of the land mobile radio and to control activation of the one or more images comprising the symbol to indicate the changed state of the land mobile radio,
   wherein the symbol is depicted and not depicted responsive to changes in the state of the land mobile radio and on the electroluminescent display of the land mobile radio proximate to the labels for the plurality of function buttons, and
   wherein at least one of the labels is displayed continuously during the changes in the state of the land mobile radio.

2. The control head of claim 1, further comprising:
   a high voltage power supply receiving input power from a radio battery supply through a FET switch controlled by the video driver, wherein output voltage levels are adjustable by a volume adjustment potentiometer to set a brightness level of the electroluminescent display, and wherein power supply switching frequency is controlled by the video driver.

3. The control head of claim 1, wherein the video driver contains a display data buffer, a frame timing generator, and display control logic to control operation of a negative row voltage charge/discharge FET, a positive row voltage charge/discharge FET, a row HV driver/shift register, and a column HV driver/shift register.

4. The control head of claim 1, wherein the video driver contains a display data buffer that is a RAM that is accessed by the control head controller to load pixel data for the one or more images and by internal frame generator logic to read the pixel data, and the control head controller to load data into the display buffer though a parallel data port.

5. The control head of claim 1, wherein the video driver contains a frame timing generator that generates internal frame start, line start, pixel data, and pixel clock signals that are used by display control logic to control the circuitry connected to the electroluminescent display.

6. The control head of claim 1, further comprising:
a first LED to provide a first light; and
a second LED to provide a second light,
wherein the control head controller configured to detect the change in the state of the land mobile radio is further configured to control activation of the first LED to indicate the changed state of the land mobile radio.

7. The control head of claim 6, wherein the control head controller is further configured to control activation of the second LED to illuminate the electroluminescent display during an idle state of the land mobile radio.

8. The control head of claim 7, wherein an intensity of the first LED is fixed, and an intensity of the second LED is adjustable.

9. The control head of claim 1, wherein the first LED and the second LED both illuminate a first light pipe to illuminate the electroluminescent display.

10. The control head of claim 1,
wherein the first LED illuminates a first light pipe to illuminate a user actuable button, and
wherein the second LED illuminates a second light pipe to illuminate the electroluminescent display.

11. A system for configuring a control head of a land mobile radio having an electroluminescent display, the system comprising:
a computer memory storing a configuration;
a controller configured to generate display data according to one of various display modes as defined by the configuration;
a video driver connected to the controller and buffering the one or more images into a video stream for rendering on the electroluminescent display,
a control head having the electroluminescent display rendering images formed of the display data, a plurality of push buttons comprising function buttons on the control head separate from and under the electroluminescent display;

wherein a first portion of the images comprise labels for the plurality of function buttons separate from and under the electroluminescent display, wherein a second portion of the images comprise a symbol indicating operating status of the land mobile radio;
a computer processor executing a process whereby a user of the computer processor specifies the display mode to be defined by the configuration; and
a control head controller to determine the state of the land mobile radio, to detect a change in the state of the land mobile radio, and to control activation of the images displayed on the electroluminescent display to indicate the changed state of the land mobile radio and displaying the second portion of the images comprising the symbol indicating operating status of the land mobile radio proximate to the first portion of the images comprising the labels for the plurality of function buttons separate from and under the electroluminescent display wherein the symbol is depicted and not depicted responsive to changes in the state of the land mobile radio and on the electroluminescent display of the land mobile radio proximate to the labels for the plurality of function buttons, and wherein at least one of the labels is displayed continuously during the changes in the state of the land mobile radio.

12. The system of claim 11, wherein the computer processor utilizes a menu whereby the user selects whether to inhibit display of a zone and a channel to modify the configuration.

13. The system of claim 11, further comprising: a first LED to provide a first light; and
a second LED to provide a second light,
wherein the control head controller to detect the change in the state of the land mobile radio is configured to control activation of the first LED to indicate the changed state of the land mobile radio.

14. The system of claim 13, wherein the control head controller is further configured to control activation of the second LED to illuminate the electroluminescent display during an idle state of the land mobile radio.

15. The system of claim 13, wherein an intensity of the first LED is fixed, and an intensity of the second LED is adjustable.

16. The system of claim 13, wherein an intensity of the second LED is adjustable via a menu whereby the user selects the display mode to modify the configuration.

17. The system of claim 13, wherein the first LED and the second LED both illuminate a first light pipe to illuminate the electroluminescent display.

18. The control head of claim 1, wherein the symbol comprises at least one two-dimensional representation of a radio transmitter.

19. The system of claim 11, wherein the symbol comprises at least one two-dimensional representation of a radio transmitter.

* * * * *